No. 733,622. PATENTED JULY 14, 1903.
R. S. BROWNLOW.
FILTER.
APPLICATION FILED JUNE 10, 1902.
NO MODEL. 2 SHEETS—SHEET 1.

WITNESSES:
F. W. Wright
Walter Abb

INVENTOR
RICHARD SYDNEY BROWNLOW
BY Howson and Howson
HIS ATTORNEYS.

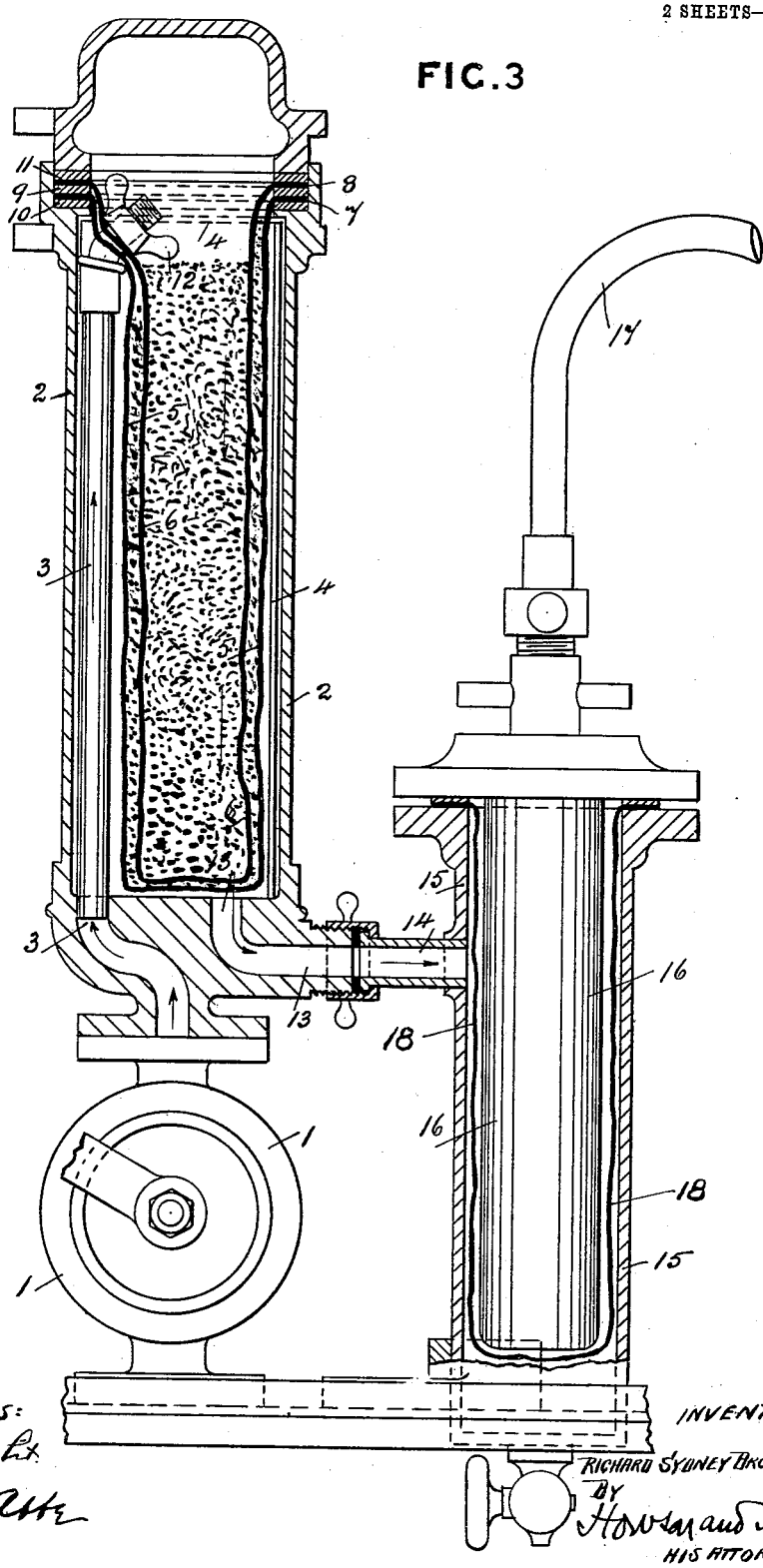

No. 733,622. Patented July 14, 1903.

UNITED STATES PATENT OFFICE.

RICHARD SYDNEY BROWNLOW, OF MANCHESTER, ENGLAND.

FILTER.

SPECIFICATION forming part of Letters Patent No. 733,622, dated July 14, 1903.

Application filed June 10, 1902. Serial No. 111,047. (No model.)

*To all whom it may concern:*

Be it known that I, RICHARD SYDNEY BROWNLOW, a subject of the King of Great Britain and Ireland, residing at Abbey Hey Works, Gorton, Manchester, in the county of Lancaster, England, have invented new and useful Improvements Applicable to Filters, of which the following is a specification.

This invention relates to improvements in portable field-filters for the use of troops and the like; and my improvements consist principally of a tripod stand, force-pump, and an air vessel by which water to be filtered is forced through the filtering medium, which is formed of a cylinder of porous earthenware or other suitable filtering material, the filtered water passing off from the interior of said cylinder for use as required.

Figure 1:
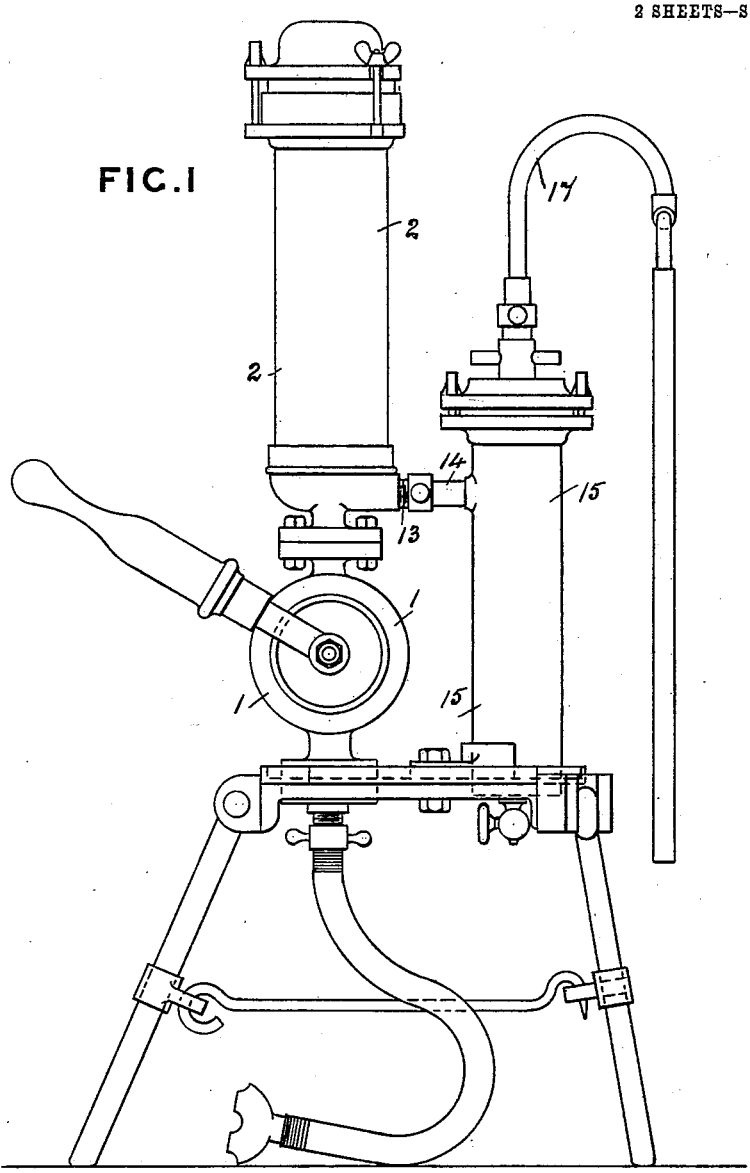
Figure 2:
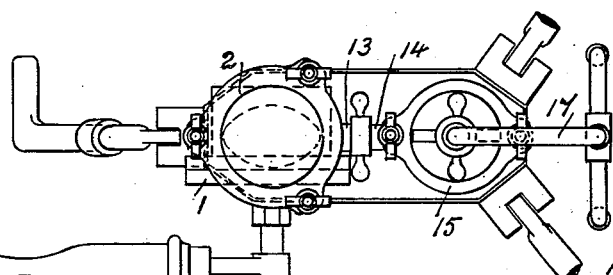

In the accompanying drawings, illustrating my said invention and to which I hereinafter refer, Figure 1 is a side elevation, and Fig. 2 a plan, of a filter such as I have hereinbefore named with my improvements applied. Fig. 3 is a vertical section of my improved filter drawn to an enlarged scale.

In the views the same figures refer to like parts.

It has been found that filters which have been employed for filtering water containing a considerable amount of mud or clay in suspension are very liable to become soon choked by reason of the mud and clay accumulating outside the porous cylinders, necessitating frequent removal and cleansing in order to maintain their proper efficiency.

The object of this my invention is to remedy this defect by removing or collecting the greater portion of the suspended mud or clay from the water before it reaches the outer surface of the porous filtering material. For this purpose I bolt or otherwise fix to the upper part of the force-pump 1 a primary filter consisting of a metallic cylinder or case 2, the top of which is dome-shaped and forms an air-chamber by means of which a regular and continuous flow of water is maintained from the pump to the upper portion of the cylinder 2 through the tube 3, which is fitted, preferably, within said cylinder, the same regular flow being also maintained through the outlet. I place within the cylinder 2 a lining of strong tinned gauze 4, formed with vertical strengthening-ribs, which prevent the gauze from being forced against the side of the filter by the pressure of water and allow a free course for the water between the said ribs, and I place within this gauze-lining bags, as 5 and 6, formed of any preferred woven fabric. These bags are fixed to and supported by metal rings 7 and 8, with india-rubber washers 9 and 10 between them, forming an air and water tight joint. The upper end of the pipe 3 passes through into the interior of the bags 5 and 6, which may be filled with sand, charcoal, or other filtering material, and another rubber ring 11 makes a joint with the cover. The upper end of the pipe 3 is threaded and passes through a small hole in the bags 5 and 6, and a water-tight joint is made with the bags by screwing down a winged nut 12 against a rubber washer sitting on the flange of pipe 3.

The bags 5 and 6 may in preference be filled with a thick liquid consisting of fine asbestos powder or other similar filtering material mixed with water to a creamy consistency, which adheres to and coats the surface of the bags, thus forming an additional filter.

I connect the outlet 13 at the base of the cylinder 2 with a pipe 14, leading into the cylinder or casing 15, in which the porous earthenware cylinder 16 is contained, through which the water percolates and is drawn off through the outlet 17.

As an additional protection against mud or other solid matters in suspension settling on the surface of the porous cylinder, I may inclose the said porous cylinder in a tubular bag 18, made of closely-woven material, filtering-cloth, felt, or other material of a similar nature stiffened with rings of wire or with wire-gauze placed between the bag and the cylinder and so made that it can be readily removed and replaced. In like manner the bags 5 and 6, hereinbefore described, can be easily taken out, washed, and replaced. By these means the pores in the filtering-cylinders 16 will not be liable to become choked, and the efficiency of such cylinders will thereby be prolonged almost indefinitely.

I claim as my invention—

The herein-described portable filtering apparatus, comprising a force-pump, a primary filter provided with a dome-shaped cover forming a compressed-air chamber, and a final filter connected with the discharge of said primary filter and containing an earthenware filtering-cylinder, and a stand on which the pump and filters are mounted, said pump having its delivery entering the primary filter above the filtering material therein and below the compressed-air chamber, whereby a continuous flow of liquid is maintained through said filters, substantially as described.

In testimony whereof I have signed my name to this specification in the presence of two subscribing witnesses.

RICHARD SYDNEY BROWNLOW.

Witnesses:
JNO. HUGHES,
J. ERNEST HUGHES.